(12) United States Patent
Shao et al.

(10) Patent No.: US 8,842,739 B2
(45) Date of Patent: Sep. 23, 2014

(54) METHOD AND SYSTEM FOR COMMUNICATION OF UNCOMPRESSED VIDEO INFORMATION IN WIRELESS SYSTEMS

(75) Inventors: Huai-Rong Shao, Santa Clara, CA (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1266 days.

(21) Appl. No.: 12/048,126

(22) Filed: Mar. 13, 2008

(65) Prior Publication Data

US 2009/0021646 A1    Jan. 22, 2009

Related U.S. Application Data

(60) Provisional application No. 60/961,541, filed on Jul. 20, 2007.

(51) Int. Cl.
| | |
|---|---|
| *H04N 7/12* | (2006.01) |
| *H04N 21/24* | (2011.01) |
| *H04N 7/06* | (2006.01) |
| *H04N 21/63* | (2011.01) |
| *H04N 21/2385* | (2011.01) |
| *H04W 72/04* | (2009.01) |

(52) U.S. Cl.
CPC ......... *H04N 21/631* (2013.01); *H04N 21/2402* (2013.01); *H04N 7/12* (2013.01); *H04N 7/063* (2013.01); *H04W 72/04* (2013.01); *H04N 21/2385* (2013.01)
USPC ..................... 375/240.24; 348/608

(58) Field of Classification Search
CPC .................................. H04N 19/0086
USPC ............ 375/240.12, 240.26, 240.27; 348/608
See application file for complete search history.

(56) References Cited

U.S. PATENT DOCUMENTS

| | | | |
|---|---|---|---|
| 4,661,862 | A | 4/1987 | Thompson |
| 5,189,510 | A | 2/1993 | Henaff et al. |
| 5,289,190 | A | 2/1994 | Shimoda et al. |
| 5,453,840 | A | 9/1995 | Parker et al. |

(Continued)

FOREIGN PATENT DOCUMENTS

| | | |
|---|---|---|
| CN | 1402852 A | 3/2003 |
| CN | 1708754 A | 12/2005 |

(Continued)

OTHER PUBLICATIONS

International Search Report and Written Opinion mailed Dec. 6, 2010 in PCT/KR2010/002192, 6 pp., Korean Intellectual Property Office, Republic of Korea.

(Continued)

*Primary Examiner* — Dang Ton
*Assistant Examiner* — Kevin Lee
(74) *Attorney, Agent, or Firm* — Kenneth L. Sherman, Esq.; Michael Zarrabian, Esq.; Sherman & Zarrabian LLP

(57) ABSTRACT

A method and system for communicating video information over wireless channels is provided. Communicating video information involves receiving a frame of video pixel information, partitioning spatially correlated pixels into different partitions and allocating pixel information from the pixel partitions across one or more of said multiple channels based on channel conditions. The allocated pixel information is transmitted on the one or more multiple channels.

26 Claims, 8 Drawing Sheets

(56) References Cited

U.S. PATENT DOCUMENTS

| | | | |
|---|---|---|---|
| 5,936,669 A | 8/1999 | Niesen | |
| 5,969,764 A | 10/1999 | Sun et al. | |
| 6,052,159 A | 4/2000 | Ishii et al. | |
| 6,088,045 A * | 7/2000 | Lumelsky et al. | 345/531 |
| 6,094,453 A | 7/2000 | Gosselin et al. | |
| 6,115,420 A | 9/2000 | Wang | |
| 6,201,834 B1 | 3/2001 | Zhu | |
| 6,239,886 B1 | 5/2001 | Klassen et al. | |
| 6,298,085 B1 | 10/2001 | Kondo et al. | |
| 6,418,240 B1 | 7/2002 | Yu | |
| 6,512,218 B1 | 1/2003 | Canini et al. | |
| 6,571,016 B1 | 5/2003 | Mehrotra et al. | |
| 6,757,435 B2 | 6/2004 | Kondo | |
| 6,868,186 B1 | 3/2005 | Sadeh | |
| 6,973,221 B1 | 12/2005 | Xue | |
| 7,015,961 B2 | 3/2006 | Kakarala | |
| 7,027,515 B2 | 4/2006 | Lin | |
| 7,075,993 B2 | 7/2006 | O'Brien, Jr. | |
| 7,082,166 B2 | 7/2006 | Prakash et al. | |
| 7,099,678 B2 * | 8/2006 | Vaidyanathan | 455/500 |
| 7,103,669 B2 | 9/2006 | Apostolopoulos | |
| 7,113,556 B1 | 9/2006 | Heegard et al. | |
| 7,227,900 B2 | 6/2007 | Porter et al. | |
| 7,283,165 B2 | 10/2007 | Alderson et al. | |
| 7,339,993 B1 | 3/2008 | Brooks et al. | |
| 7,627,348 B2 * | 12/2009 | Lysejko et al. | 455/562.1 |
| 7,630,442 B2 | 12/2009 | Sekiguchi et al. | |
| 7,734,106 B1 | 6/2010 | Zhang et al. | |
| 7,991,055 B2 | 8/2011 | Cancemi et al. | |
| 8,098,741 B2 | 1/2012 | Suh et al. | |
| 2003/0072366 A1* | 4/2003 | Bartolucci et al. | 375/240.04 |
| 2004/0194008 A1* | 9/2004 | Garudadri et al. | 714/821 |
| 2006/0013299 A1 | 1/2006 | Satio et al. | |
| 2006/0013320 A1 | 1/2006 | Oguz et al. | |
| 2006/0146940 A1 | 7/2006 | Gomila et al. | |
| 2006/0239360 A1 | 10/2006 | Kadono et al. | |
| 2006/0268760 A1* | 11/2006 | Fang et al. | 370/328 |
| 2007/0014360 A1 | 1/2007 | Botzko et al. | |
| 2007/0091999 A1 | 4/2007 | Nissan-Cohen et al. | |
| 2007/0098063 A1 | 5/2007 | Reznic et al. | |
| 2007/0189383 A1 | 8/2007 | Shao et al. | |
| 2007/0202842 A1 | 8/2007 | Shao et al. | |
| 2007/0296822 A1 | 12/2007 | Lan et al. | |
| 2008/0101467 A1 | 5/2008 | MacMullan et al. | |
| 2008/0107330 A1* | 5/2008 | Cotman et al. | 382/156 |
| 2008/0144553 A1 | 6/2008 | Shao et al. | |
| 2008/0232478 A1 | 9/2008 | Teng et al. | |
| 2008/0267299 A1 | 10/2008 | Hannuksela et al. | |
| 2008/0285651 A1 | 11/2008 | Au et al. | |
| 2009/0063935 A1 | 3/2009 | Singh et al. | |
| 2010/0014584 A1 | 1/2010 | Feder et al. | |
| 2010/0150463 A1 | 6/2010 | Yeung et al. | |
| 2010/0166057 A1 | 7/2010 | Huchet et al. | |
| 2010/0265392 A1 | 10/2010 | Shao et al. | |
| 2011/0109792 A1 | 5/2011 | Montag | |

FOREIGN PATENT DOCUMENTS

| | | |
|---|---|---|
| CN | 1905679 A | 1/2007 |
| JP | 2002-032295 | 1/2002 |
| JP | 2006-526367 A | 11/2006 |
| JP | 2008-219479 | 9/2008 |
| KR | 10-2009-0100219 A | 9/2009 |
| WO | 2004073201 | 8/2004 |
| WO | 2004073201 A1 | 8/2004 |
| WO | 2008030032 A2 | 3/2008 |
| WO | 2008060025 A1 | 5/2008 |

OTHER PUBLICATIONS

International Search Report dated Oct. 12, 2007 for International Application No. PCT/KR2007/003251 from Korean Intellectual Property Office, filed Jul. 4, 2007, 2 pages.

Hitachi, Ltd. et al., "High-Definition Multimedia Interface Specification Version 1.2," Aug. 22, 2005, pp. 1-214, United States.

Schwarz, H. et al., "Overview of the Scalable Video Coding Extension of the H.264/AVC Standard", IEEE Transactions on Circuits and Systems for Video Technology, vol. 17, No. 9, Sep. 2007, pp. 1-18, United States.

International Search Report and Written Opinion dated Oct. 12, 2007 for International Application No. PCT/KR2007/003251 from Korean International Property Office, filed Jul. 4, 2007, 10 pages, Seo-gu, Daejeon, Republic of Korea.

U.S. Non-Final Office Action for U.S. Appl. No. 11/598,920 mailed May 6, 2011.

U.S. Final Office Action for U.S. Appl. No. 11/598,920 mailed Jul. 25, 2012.

Korean Office Action dated Nov. 11, 2009 for Korean Patent Application No. 10-2008-7006604, pp. 1-3, Korean Intellectual Property Office, Seo-gu, Daejeon, Republic of Korea (Machine-generated English translation attached, pp. 1-2).

Korean Final Office Action dated Feb. 18, 2010 for Korean Patent Application No. 10-2008-7006604, pp. 1-2, Korean Intellectual Property Office, Seo-gu, Daejeon, Republic of Korea (Machine-generated English translation attached, p. 1).

U.S. Final Office Action for U.S. Appl. No. 11/598,920 mailed Oct. 19, 2011.

U.S. Notice of Allowance for U.S. Appl. No. 11/897,087 mailed Jan. 20, 2012.

U.S. Non-Final Office Action for U.S. Appl. No. 11/598,920 mailed Apr. 3, 2012.

U.S. Notice of Allowance for U.S. Appl. No. 11/897,087 mailed Apr. 25, 2012.

U.S. Non-Final Office Action for U.S. Appl. No. 11/598,920 mailed Mar. 13, 2013.

U.S. Non-Final Office Action for U.S. Appl. No. 12/754,522 mailed Jan. 18, 2013.

U.S. Notice of Allowance for U.S. Appl. No. 11/598,920 mailed Aug. 15, 2013.

Chinese Office Action dated Dec. 26, 2013 for Chinese Patent Application No. 201080017149.0, pp. 1-14, China Intellectual Property Office, Beijing City, China (A machine-generated English translation, pp. 1-7).

Japanese Office Action dated Feb. 18, 2014 for Japanese Patent Application No. 2012-505807, pp. 1-4, Japan Patent Office, Tokyo, Japan (A machine-generated English translation, pp. 1-2).

U.S. Final Office Action for U.S. Appl. No. 12/754,522 mailed May 16, 2013.

* cited by examiner

METHOD AND SYSTEM FOR COMMUNICATION OF UNCOMPRESSED VIDEO INFORMATION IN WIRELESS SYSTEMS

RELATED APPLICATION

This application claims priority from U.S. Provisional Patent Application Ser. No. 60/961,541, filed on Jul. 20, 2007, incorporated herein by reference.

FIELD OF THE INVENTION

The present invention relates to wireless communication of video information and in particular to wireless communication of uncompressed video information.

BACKGROUND OF THE INVENTION

In conventional wireless communication systems for transmission of compressed video information, typically multiple compressed video frames transmitted from a transmitter are buffered at a receiver to overcome wireless channel bandwidth fluctuation, reduce transmission jitter and facilitate error concealment. Such buffering at the receiver may be appropriate for compressed video since the total required memory buffer size to store multiple compressed video frames is small and can be accommodated by available buffer size on typical wireless chips.

However, for uncompressed video information such as high definition (HD) video, typical wireless chips do not include sufficient memory to buffer even a single uncompressed video frame. For example, for a 1080p video format, each video frame comprises active picture information of 1920 rows and 1080 lines, with each pixel having 24 bits, wherein each video frame comprises about 6 Mbytes of video information. Due to the size and cost constraints of millimeter-wave (mmWave) wireless chips, usually a receiver with an mmWave wireless chip can buffer only a portion of an uncompressed video frame. Therefore, commonly used error concealment schemes (such as copying information from a previous frame to recover error in a current frame) are not applicable to mmWave wireless chips.

At a 60 GHz frequency band, there is more free space loss than at 2 or 5 GHz since free space loss increases quadratically with frequency. In principle, this higher free space loss can be compensated for using antennas with more pattern directivity while maintaining small antenna dimensions. When such antennas are used, however, obstacles can easily cause a substantial drop of received power and block the channel for several seconds. Conventional solutions such as dynamic beam searching can be used to relieve this blocking effect and reduce the blocking time. However, for uncompressed video streaming applications, due to a very limited available buffer size compared to the very high data rate, such conventional solutions for reducing blocking time still significantly degrade uncompressed video reception quality such as Quality of Service (QoS).

BRIEF SUMMARY OF THE INVENTION

The present invention provides a method and system for communication of uncompressed video information in wireless systems. One embodiment involves receiving a frame of video pixel information, partitioning spatially correlated pixels into different partitions and allocating pixel information from the pixel partitions across one or more of said multiple channels based on channel conditions. The allocated pixel information is transmitted on the one or more multiple channels.

Allocating pixel information may further include evenly allocating the pixel information from the pixel partitions across said multiple channels, based on the channel conditions. Allocating pixel information may further include unevenly allocating the pixel information from the pixel partitions across said multiple channels, based on the channel conditions. Allocating pixel information may further include allocating pixel information from the pixel partitions to a subset of said multiple channels, and allocating error correction information for said pixel information to another subset of said multiple channels, based on the channel conditions. Further, allocating pixel information may include adaptively allocating pixel information from the pixel partitions to said multiple channels based on changing channel conditions.

Transmitting the allocated pixel information may further include transmitting the pixel information on each channel by beamforming transmission over multiple antennas. Transmitting the allocated pixel information may further include transmitting the pixel information on each channel by directional transmission via directional antennas. Transmitting the allocated pixel information on the one or more multiple channels may further include transmitting the allocated pixel information by time-division switched multi-beam transmission over said multiple channels. Transmitting the allocated pixel information by time-division switched multi-beam transmission over said multiple channels may further include transmitting the allocated pixel information by multi-beam transmission over said multiple channels in a time-division manner with a weighted round-robin pattern.

These and other features, aspects and advantages of the present invention will become understood with reference to the following description, appended claims and accompanying figures.

DETAILED DESCRIPTION OF THE INVENTION

The present invention provides a method and system for communication of uncompressed video information in wireless systems. One embodiment involves performing spatial partitioning of uncompressed video frames for transmission over wireless channels, such as millimeter-wave (mmWave). The spatial partitioning process utilizes multiple beams or multiple sectored antennas (in a time-division manner or in parallel), for transmitting different portions of a video frame (such as different partitions of video pixels in an uncompressed video frame). Such spatial partitioning reduces the channel blocking problem and may improve Quality of Service (QoS) for uncompressed video over, e.g., 60 GHz wireless channels.

Adaptive Spatial Partitioning Transmission

An adaptive spatial partitioning process for wireless transmission uncompressed video, according to the present invention, meets the QoS requirements of streaming over mmWave wireless channels. The adaptive spatial partitioning process includes pixel partitioning and spatial partitioning, as described in more detail below.

Pixel Partitioning

In the uncompressed video frame, geographically neighboring (spatially correlated) pixels usually have very similar, or even the same values. Regardless of how pixel partitioning is performed, so long as spatially neighboring pixels are partitioned and placed into different packets for transmission, then if pixel information in a received packet is corrupted (i.e., lost or damaged), one or more other packets which contain pixels that are spatially related to the corrupt pixel(s) can be used to recover (compensate for) the corrupt pixel information.

Preferably, partitioning is performed such that pixels with minimal spatial distance are placed into different packets for transmission over a wireless channel. Further, partitioning can be performed by distributing y number of spatially correlated pixels into z number of different packets, wherein y≠z. In one example, y can be greater than z, whereby at least one of the packets includes two or more spatially correlated (neighboring) pixels from a partition. It is also possible to split pixels vertically. However, for an interlaced format, since two neighboring lines are already split into two separate fields, it is preferable to partition horizontally for each field if only two partitions are required.

Figure 1:
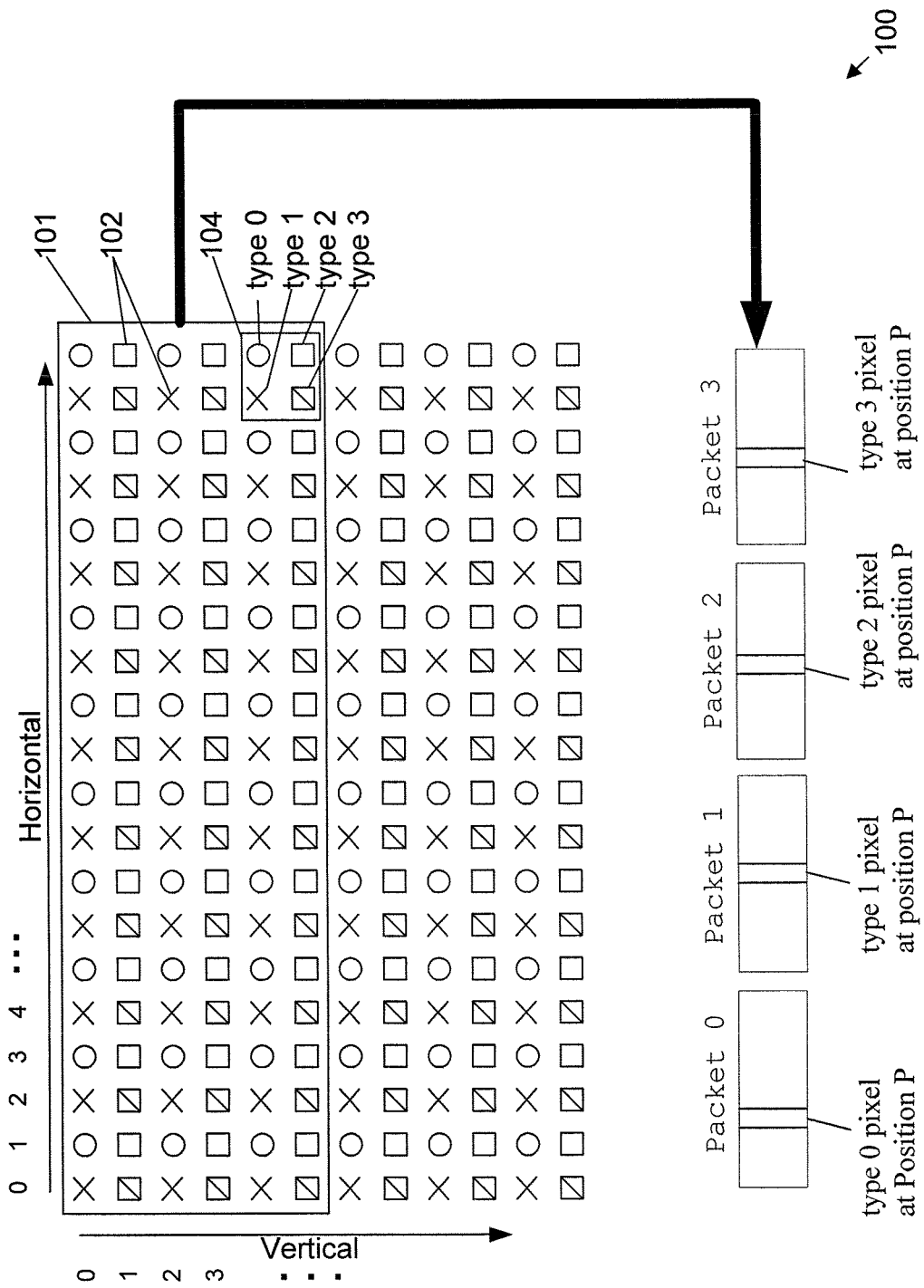
FIG. 1 shows an example of spatial partitioning of pixels into two partition packets, according to an embodiment of the present invention.

FIG. 1 shows an example application 100 for partitioning a frame 101 of pixels 102, and packetizing for K=4 partitions. In this example, the pixels are split into four types (i.e., types 0, 1, 2, 3) of 2×2 blocks 104, wherein K=4 pixels per block. The four pixels in each 2×2 block 104 are placed into four (4) different packets (i.e., Packets 0, 1, 2, 3) as shown. Pixels with minimal spatial distance are placed into different packets for transmission.

Specifically, for the type 0 pixels (i.e., partition j), the indices i and j are even numbers (i.e., i=0, 2, 4, . . . , etc., and j=0, 2, 4, . . . , etc.), and the type 0 pixels are placed in the Packet 0. For the type 1 pixels (i.e., partition 1), the index i is odd (i.e., i=1, 3, 5, . . . etc.), the index j is even (i.e., j=0, 2, 4, . . . , etc.), and the type 1 pixels are placed in the Packet 1. For the type 2 pixels (i.e., partition 2), the index i is even (i.e., i=0, 2, 4, . . . , etc.), the index j is odd (i.e., j=1, 3, 5, . . . , etc.), and the type 2 pixels are placed in the Packet 2. For the type 3 pixels (i.e., partition 3), the indices i and j are odd numbers (i.e., i=1, 3, 5, . . . , etc., and j=1, 3, 5, . . . , etc.), and the type 3 pixels are placed in the Packet 3. A cyclic redundancy check (CRC) value for each packet may be appended at the end of the packet before transmission to a receiver of a wireless channel.

If during transmission, a pixel in one packet (e.g., Packet 0) is corrupted, then spatially related pixels in the other three packets (e.g., Packets 1, 2 or 3) can be used at the receiver to compensate for the corrupted pixel. As such, if pixel information in position P in a packet (e.g., Packet 0) is corrupted, then the pixel information in position P in other spatially related packets (e.g., Packets 1, 2 or 3) can be used to compensate for the corrupted information.

Different packets can be transmitted at a single channel or at different channels/paths. In addition to robustness improvement, in the case when one channel/path cannot meet the bandwidth requirement for an uncompressed video stream, spatial pixel partitioning can take advantage of multi-channels/paths to transmit all data of an uncompressed video stream.

In general, square/rectangular blocks 104 (each block including multiple pixels therein), can be used for partitioning the multiple pixels in each block into corresponding multiple packets, wherein for each block, preferably each pixel in that block is placed in a different packet for transmission.

As such, the neighboring pixels in a video frame are partitioned to different packets and each packet is transmitted separately over a lossy wireless channel. If one packet is lost or erroneous, data in other packets carrying the neighboring pixels can be used to recover the pixels in the lost or erroneous packet. There are at least two approaches to recover a lost or erroneous pixel. The simplest approach involves copying pixels from a neighboring packet. The second approach involves using the average value of each pixel in all other neighboring partition packets.

In FIG. 1, as an example, four pixels in each 2×2 block are put into 4 different packets. After pixel partitioning, different packets are transmitted at a single channel or different channels/paths. Besides robustness improvement, in case one channel/path cannot meet the bandwidth requirement for an uncompressed video stream such as an HD video stream, then adaptive spatial pixel partitioning can take advantage of multi-channels/paths to meet the bandwidth requirement, as described in more detail below.

Spatial Partitioning Transmission

Figure 2:
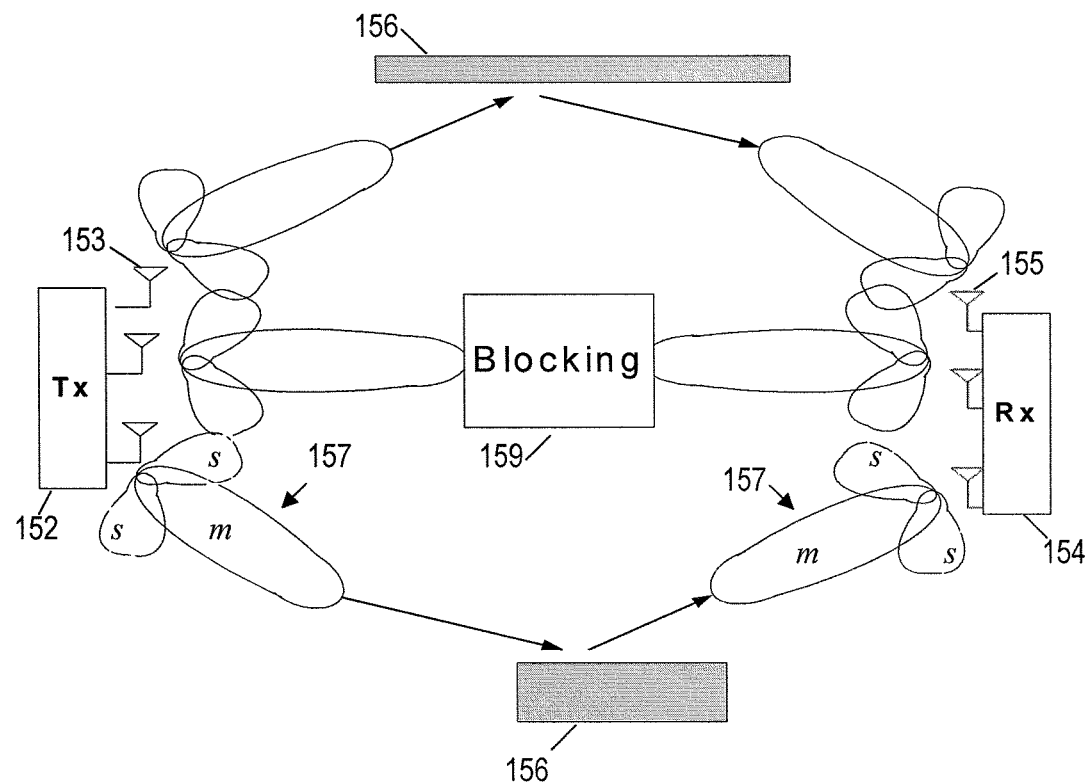
FIG. 2 shows an mmWave wireless transmitter and a receiver in a video streaming wireless system.

Usually multiple beams or directional paths can be found between a mmWave wireless transmitter and a receiver 10 in a video streaming wireless system 150 shown in FIG. 2, such as a living room. The system 150 includes a wireless transmitter 152 (Tx) having multiple antennas 153 and a wireless receiver 154 having multiple antennas 155. The wireless signals comprise directional beam signals 157, each directional beam comprises a main lobe m and side lobes s. An object 159 is shown blocking a directional beam between the Tx 152 and the Rx 154, wherein objects 156 (e.g., walls, wood furniture) can help reflect other directional beams.

In conventional dynamic beam-steering approaches, the transmitter and the receiver always attempt to find the best directional beam for their directional transmissions. If the best beam is blocked by an object, the transmitter and receiver perform dynamic beam searching to determine a new best directional beam. Such dynamic beam-searching and beam-tracking approaches require long durations to detect whether a current beam is of sufficient quality for transmission. An additional time period is required to determine another best beam. As such, the overall duration for recovering (recovery delay) from a blocked best beam (best channel/path) to finding another beam is substantial (e.g., at least 1 ms). In case a beam is blocked, the limited sizes of the transmitter and receiver buffers do not allow for buffering an incoming uncompressed video stream while the transmitter and receiver engage in a typically lengthy beam-searching to find another beam. As such, when a mmWave channel is blocked, video streaming is interrupted while the transmitter and receiver establish another beam for transmission therebetween. As a result, conventional dynamic beam-searching and beam-tracking approaches cannot meet QoS requirements of uncompressed video streaming.

Figure 3:
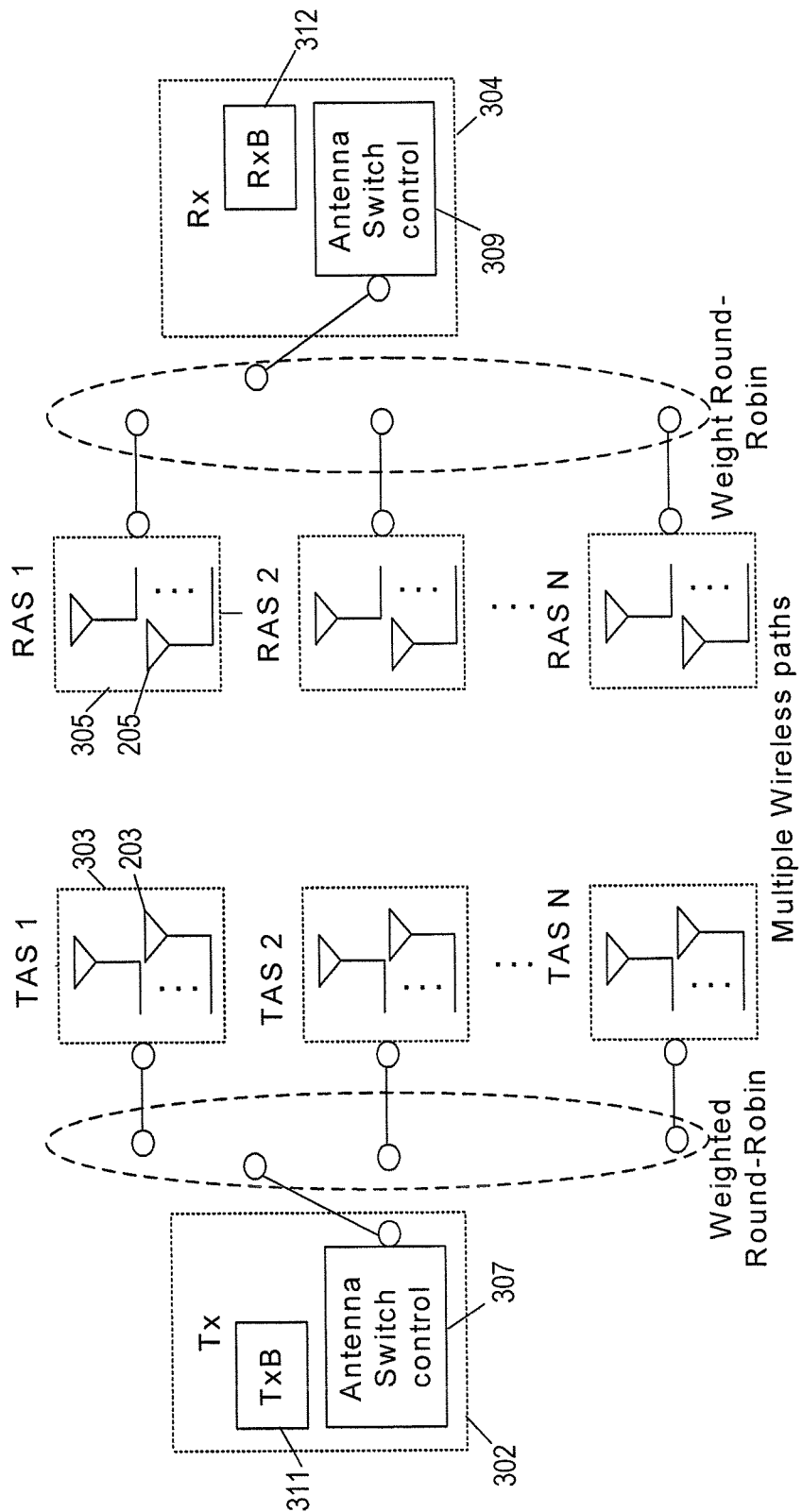
FIG. 3 shows an architecture for a spatial partitioning function, according to an embodiment of the present invention.

The spatial partitioning transmission process according to the present invention provides switched multi-beam transmission of spatially partitioned pixel information between a transmitter and receiver, to reduce the possibility of video streaming interruption when a mmWave channel is blocked. FIG. 3 shows an example architecture 300 for a spatial partitioning function according to the present invention. The architecture 300 involves an mmWave wireless communication system including a wireless transmitter (Tx) 302 and a wireless receiver (Rx) 304. Antenna switching control functions 307 and 309 allow adaptive pixel partition allocations to multiple channels/paths based on channel conditions. Channel conditions includes available bandwidth (i.e., the data rate that a channel can support), the channel quality (e.g., signal-to-noise-ratio, bit error rate or packet error rate), etc. If the channel quality can satisfy the video transmission requirement, then the transmitter determines how many pixel partitions to allocate to the channel based on the available channel bandwidth.

At the antenna training stage, a beam candidate table (TxB) 311 is generated at the Tx 302 and a corresponding RxB 312 is generated at the Rx 304. Each beam candidate entry in a beam candidate table includes a beam index number and related antenna configuration information. Table 1 below show entries of example beam candidate table TxB:

TABLE 1

Transmitter Beam Candidate Table

| Beam Candidate (BC) | Beam Index (BI) | Antenna Configuration Info. (ACI) |
|---|---|---|
| BC | TxB_1 | ACI_1 |
| . | . | . |
| . | . | . |
| . | . | . |
| BC | TxB_N | ACI_N |

Table 2 below show entries of example beam candidate table RxB:

TABLE 2

Receiver Beam Candidate Table

| Beam Candidate (BC) | Beam Index (BI) | Antenna Configuration Info. (ACI) |
|---|---|---|
| BC | TxB_1 | ACI_1 |
| . | . | . |
| . | . | . |
| . | . | . |
| BC | TxB_N | ACI_N |

The beam candidates (BCs) in the tables are ordered according to beam quality (e.g., a beam indexed as TxB_m, RxB_n has better channel quality than a beam indexed as TxB_m, RxB_n, if m<n). Beam candidate tables at the transmitter/receiver are updated periodically to reflect the dynamic beam channel conditions between the transmitter and the receiver. The TxB table and the RxB table have corresponding entries.

According to the TxB and RxB table entries, the antenna configuration information for each candidate beam specifies a set (combination) 303 of the transmitter antennas 153, and a set (combination) 305 of receiver antennas 155. This provides multiple logical or physical antenna sets 303 at the transmitter side, including: Tx Antenna Set 1 (TAS 1), Tx Antenna Set 2 (TAS 2), . . . , Tx Antenna Set N (TAS N). There are also multiple logical or physical antenna sets 305 at the receiver side, including: Rx Antenna Set 1 (RAS 1), Rx Antenna Set 2 (RAS 2), . . . , Rx Antenna Set N (RAS N).

If the antenna configuration ACI can be determined in a short time period (e.g., less than about 10 to 20 microseconds), the same Tx antenna combinations can be used by different sets 303, and the same Rx antenna combinations can be used by the sets 305. Otherwise, the antennas 153 and 155 are physically divided and assigned to different antenna sets 303 and 305, respectively.

For design simplicity and cost reduction at the receiver side, a switched multi-beam transmission process may be used in place of the above-described parallel multi-beam transmission process. Specifically, different pairs of antenna sets 303 and 305 operate in a time-division manner with a weighted round-robin pattern. For example in FIG. 3, different pairs of antenna sets {TAS 1 and RAS 1}, or {TAS 2 and RAS 2}, . . . , or {TAS N or RAS N}, operate in a time-division manner with a weighted round-robin pattern. The minimal time slot for the weighted round-robin is the duration of a packet which carries one partition of pixels.

The following example assumes two sets 303 of antennas 153 at the transmitter (Tx) side, and two sets 305 of antennas 155 at the receiver (Rx) side. During an antenna training stage, TAS 1 and RAS 1 find a best beam (first beam path) with each other, then TAS 2 and RAS 2 find a good alternative beam (second beam) with each other under the constraint that the alternative beam is far away in beam pointing direction from the best beam. Depending on the conditions of the first and second beam paths, there are several possible ways to allocate the video data on the two beam paths, as described by examples below.

Figure 4:
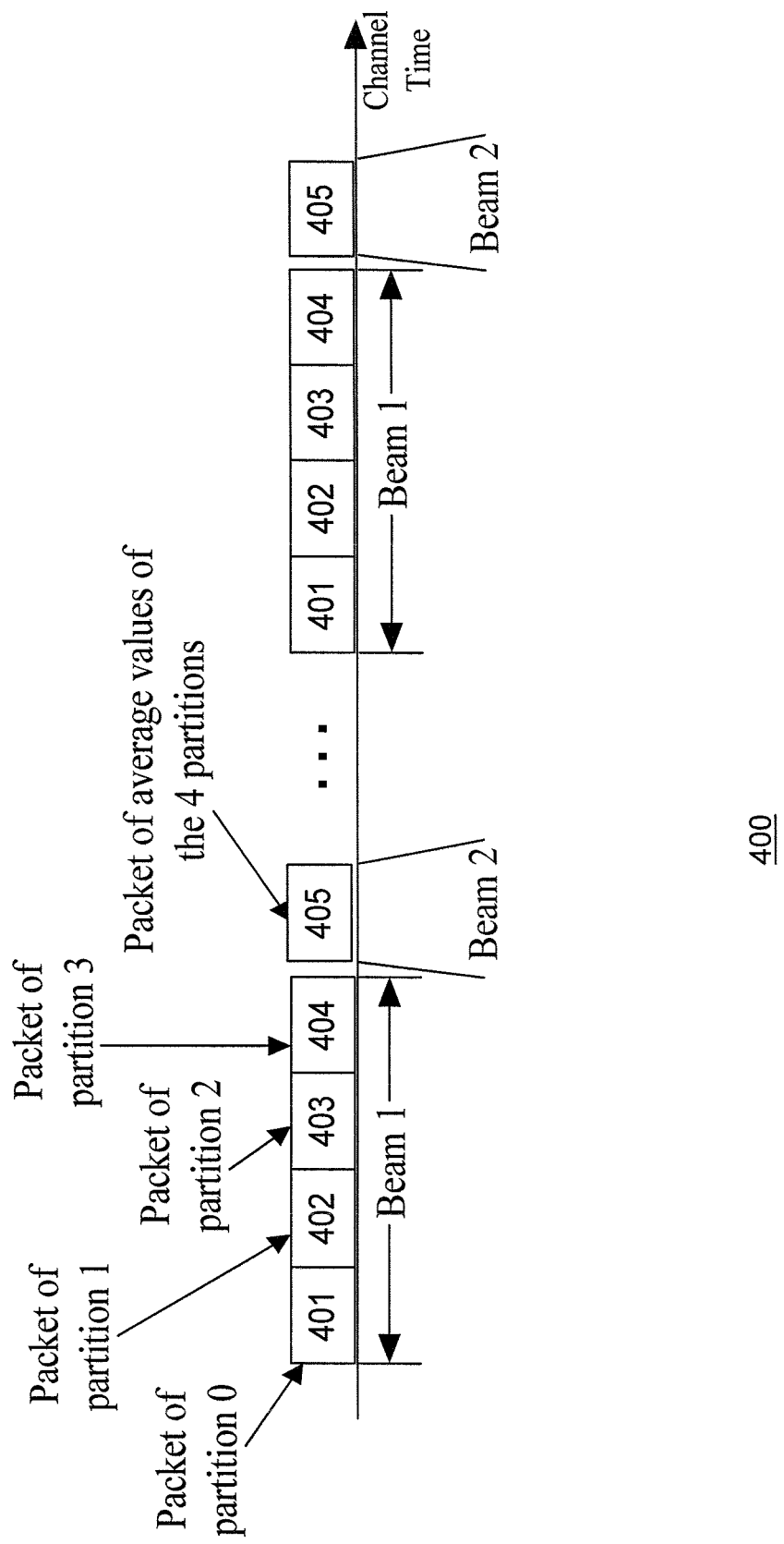
FIG. 4 shows an example of pixel partition allocation to primary/alternative wireless channels/paths, according to the present invention.

If the first beam path (Beam 1) as the primary path can provide sufficient bandwidth for all partitions of pixels, even when sharing channel time with the second beam path (Beam 2), then the second beam can be the alternative or redundant path. A first allocation example 400 is shown in FIG. 4, wherein the pixel partitions are allocated to the first beam path (Beam 1) and an average value of the pixel partitions is allocated to the second beam path (Beam 2). As such, the second beam is used as a redundant path to improve transmission robustness. For example, Beam 1 carries all four pixel partitions of the video stream as packets 401, 402, 403, 404 (e.g., Packet 0, Packet 1, Packet 2 and Packet 3 in FIG. 1). Further, Beam 2 carries the average pixel values of the four partitions as a packet 405. If a partition packet transmitted via Beam 1 is received with errors, then the corresponding average packet 405 transmitted via Beam 2 can be used to recover from the packet received with errors. In the worst case where Beam 1 is completely blocked, the packets 405 carried at the second beam can be immediately used to reconstruct the video frames at the receiver.

Figure 5:
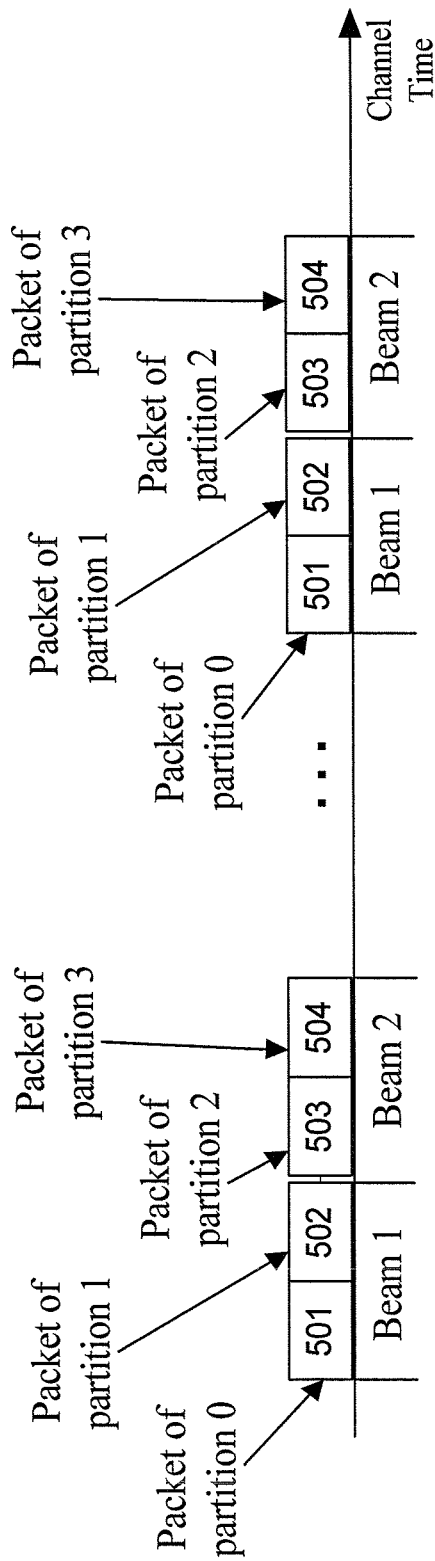
FIG. 5 shows an example of even allocation of pixel partitions to wireless channels/paths, according to the present invention.

A second allocation example involves allocating pixel partitions evenly to the two beam paths Beam 1 and Beam 2. Specifically, as shown by an example allocation 500 in FIG. 5, during the antenna training stage, if the selected two beams (i.e., primary beam path Beam 1 and secondary beam path Beam 2), have similar channel conditions, then the pixel partitions 501, 502, 503 and 504 can be evenly distributed to the two beam paths.

Figure 6:
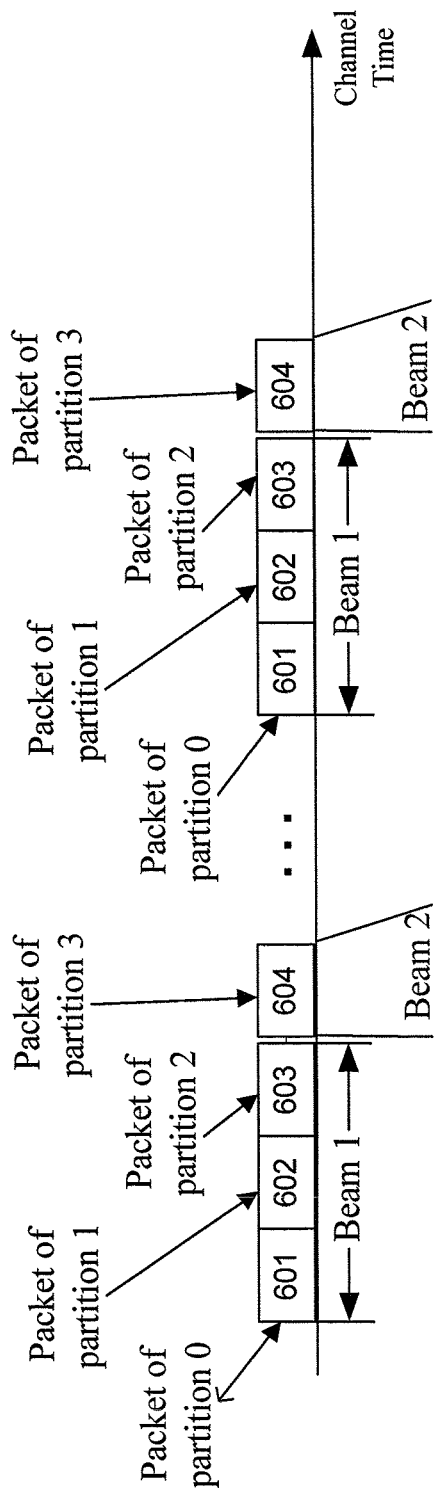
FIG. 6 shows an example of uneven allocation of pixel partitions to wireless channels/paths, according to the present invention.

Yet a third allocation example involves allocating pixel partitions unevenly to two beam paths, Beam 1 and Beam 2. Specifically, as shown by an example allocation 600 in FIG. 6, during the antenna training stage, if the two beams have different channel conditions and bandwidth capacities, then the pixel partitions are unevenly distributed to the two beam paths (i.e., primary beam path Beam 1 and secondary beam path Beam 2). As such, pixel partitions 601, 602 and 603 are allocated to Beam 1, while pixel partition 604 is allocated to Beam 2.

The main purpose of the antenna switching control functions 307 and 309 is to switch between different beams with time-division. The functions 307 and 309 may also switch between allocations. For example, during the video transmission stage, the pixel partition allocations to the two beam paths can be dynamically adjusted using antenna switching control functions 307 and 309 (e.g., switching between primary-redundant allocation, even allocation, uneven allocation), according to the actual channel conditions of the two beam paths.

Figure 7:
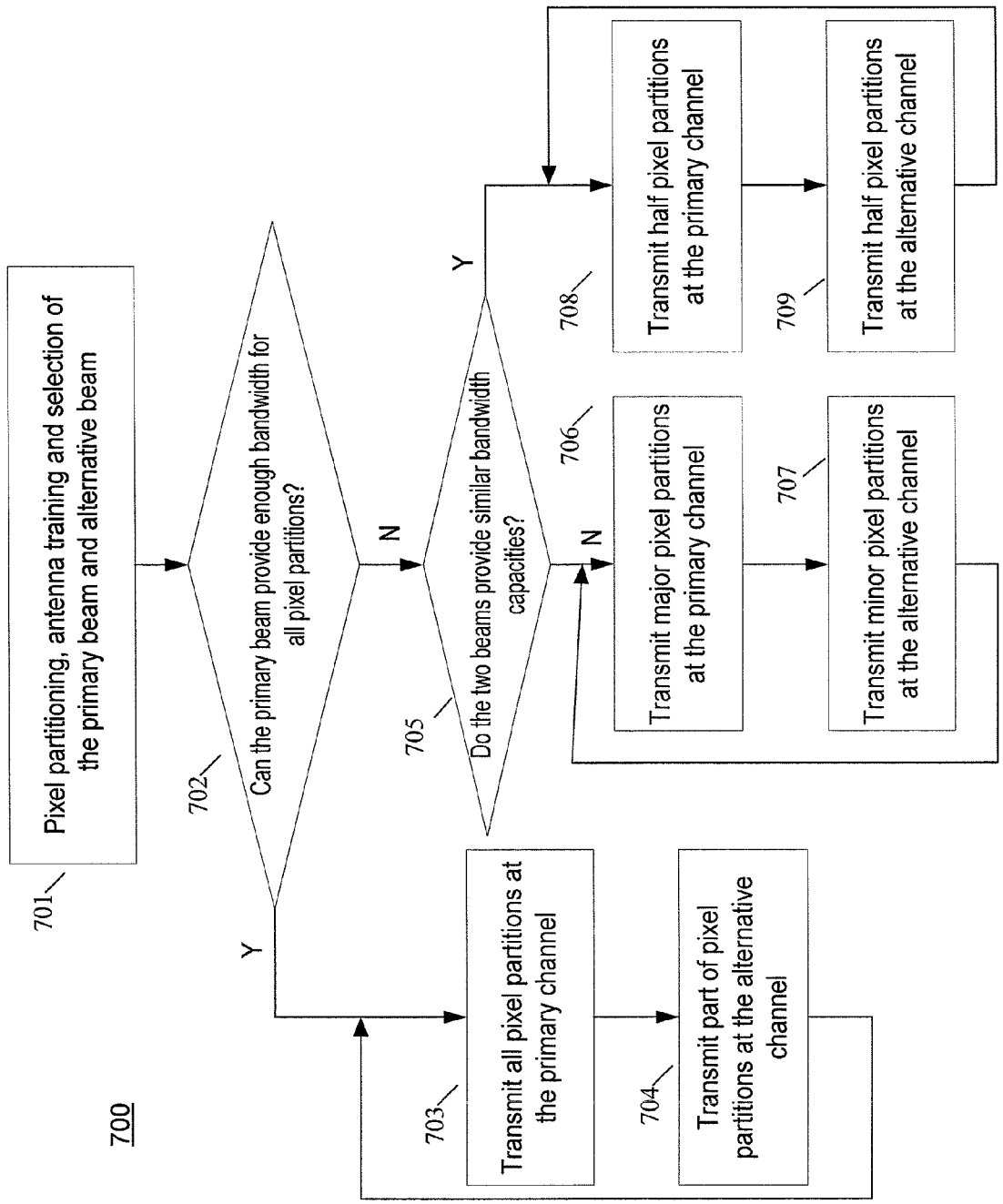
FIG. 7 shows a flowchart of a process of spatial partitioning, allocation and wireless transmission of video information, according to an embodiment of the present invention.

FIG. 7 shows a flowchart of the steps of a spatial partitioning and allocation process 700, according to an embodiment of the present invention. The process 700 includes the following steps:

Pixel Partitioning
Step 701: Perform pixel partitioning, antenna training and selection of the primary beam and alternative beam.
Step 702: Determine if the primary beam provides sufficient bandwidth for transmission of all pixel partitions? If not, go step 705.
Primary/Alternative Allocation
Step 703: Transmit all pixel partitions at the primary channel.
Step 704: Transmit part of pixel partitions (e.g., average value) at the alternative channel. Go back to step 703.
Step 705: Determine if the two beams provide similar bandwidth capacities? If yes, go to step 708.
Uneven Allocation
Step 706: Transmit major pixel partitions at the primary channel.
Step 707: Transmit minor pixel partitions at the alternative channel. Go back to step 706.
Even Allocation
Step 708: Transmit half pixel partitions at the primary channel.
Step 709: Transmit other half of pixel partitions at the alternative channel. Go back to step 708.

A frame structure may be used for data transmission between wireless stations. Frame aggregation can be used in a Media Access Control (MAC) layer and a PHY layer. The MAC layer obtains a MAC Service Data Unit (MSDU) and attaches a MAC header thereto, in order to construct a MAC Protocol Data Unit (MPDU), for transmission. The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

Figure 8:
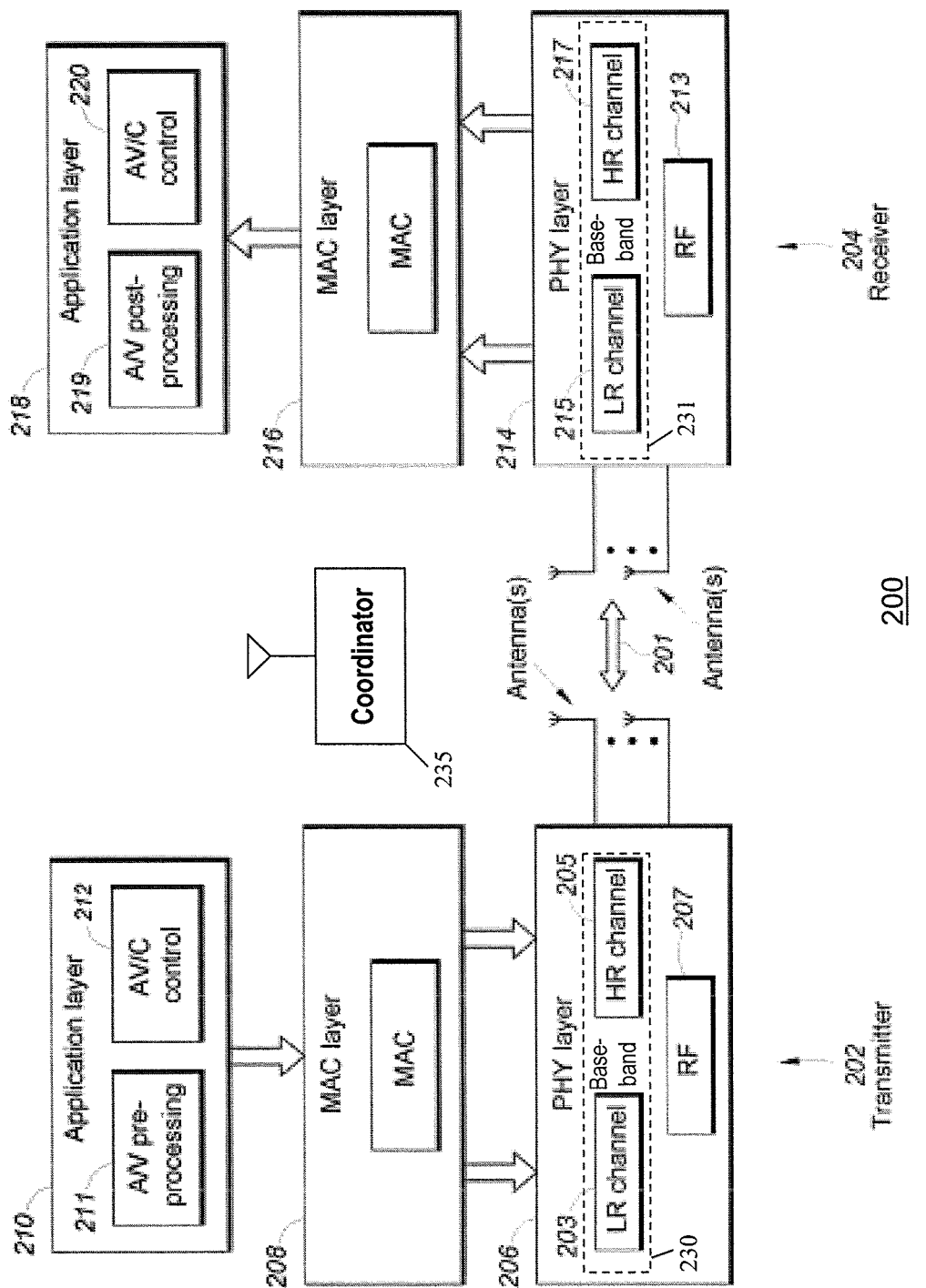
FIG. 8 shows a functional block diagram of a wireless communication system implementing spatial partitioning, allocation and wireless transmission of video information, according to an embodiment of the present invention.

FIG. 8 shows a functional block diagram of an example wireless communication system 200, implementing said spatial partitioning and transmission process 700 utilizing a frame structure, according to the present invention. The system 200 includes a wireless transmitter (sender) station 202 and wireless receiver station 204, for video transmission (the system 200 may also include a coordinator functional module 235 that facilitates video transmissions, such as in infrastructure mode; the coordinator 235 is a logical module that can be implemented as a stand-alone device or as part of the sender or the receiver).

The sender 202 includes a PHY layer 206, a MAC layer 208 and an application layer 210. The PHY layer 206 includes a radio frequency (RF) communication module 207 which transmits/receives signals under control of a baseband process module 230, via wireless channels 201. The baseband module 230 may include a low-rate channel (LR) communication module 203 for communicating control information, and a high-rate (HR) channel communication module 205 for communication video information.

The application layer 210 includes an audio/visual (A/V) pre-processing module 211 for pixel partitioning and packetizing streams as described above (e.g., FIG. 1), which are then converted to MAC packets by the MAC layer 208. The application layer 210 further includes an AV/C control module 212 which sends stream transmission requests and control commands to reserve channel time blocks for transmission of packets according to the pixel partition allocation and transmission process 700 above.

The receiver 204 includes a PHY layer 214, a MAC layer 216 and an application layer 218. The PHY layer 214 includes a RF communication module 213 which transmits/receives signals under control of a base band process module 231. The module may include a LR channel communication module 215 and a HR channel communication module 217. The application layer 218 includes an A/V post-processing module 219 for de-partitioning and de-packetizing into streams the video information in the MAC packets, received by the MAC layer 216. The application layer 218 further includes an AV/C control module 220 which handles stream control and channel access. Beamforming transmissions are performed over the HR channels. The MAC/PHY layers perform antenna training and beaming switching control (FIG. 3).

An example implementation of the present invention for mmWave wireless such as a 60 GHz frequency band wireless network can be useful with Wireless HD (WiHD) applications. Wireless HD is an industry-led effort to define a wireless digital network interface specification for wireless HD digital signal transmission on the 60 GHz frequency band, e.g., for consumer electronics (CE) and other electronic products. An example WiHD network utilizes a 60 GHz-band mmWave technology to support a physical (PHY) layer data transmission rate of multi-Gbps (gigabits per second), and can be used for transmitting uncompressed high definition television (HDTV) signals wirelessly. Another example application is for ECMA (TC32-TG20), wireless radio standard for very high data rate short range communications (ECMA stands for European Computer Manufacturers Association, which provides international standards association for information and communication systems). The present invention is useful with other wireless communication systems as well, such as IEEE 802.15.3c.

In addition to mmWave wireless applications discussed above, a spatial partitioning process according to the present invention is applicable to other wireless technologies which use beam-forming or directional transmission. Such other wireless technologies include an IEEE 802.11n wireless local area network (WLAN). Further, the present invention is applicable to certain compressed video streams in the format of multiple description coding (MDC) and layered coding.

Using a spatial pixel partitioning, a partition packet allocation, an antenna training and beam switching control process according to the present invention, the recovery delay from a blocked channel/beam in wireless communication of video information is reduced, thereby improving the overall QoS for video streaming such as uncompressed video streaming.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of communicating video information over wireless channels, comprising:
   receiving video pixel information;
   partitioning spatially correlated pixels into pixel blocks, and partitioning the spatially correlated pixels in the pixel blocks into different partitions based on pixel indexes of the spatially correlated pixels within each pixel block;
   allocating pixel information from the pixel partitions across multiple wireless channels based on channel conditions: (i) by even distribution if the channel conditions of the multiple wireless channels are similar, (ii) by uneven distribution if the channel conditions of the multiple wireless channels are dissimilar, or (iii) by allocating pixel information from the partitions to a subset of the multiple wireless channels, and allocating error correction information for the pixel information to another subset of the multiple wireless channels; and
   transmitting the allocated pixel information on said multiple wireless channels,
   wherein partitioning the spatially correlated pixels in the pixel blocks into different partitions further includes placing pixels from different partitions into different packets.

2. The method of claim 1 further including determining the conditions of the multiple wireless channels.

3. The method of claim 1, wherein allocating pixel information further includes adaptively allocating pixel information from the pixel partitions to said multiple channels based on changing channel conditions.

4. The method of claim 1, wherein the video pixel information includes uncompressed video information.

5. The method of claim 1, wherein transmitting the allocated pixel information further includes transmitting the pixel information on each channel by beamforming transmission over multiple antennas.

6. The method of claim 1, wherein transmitting the allocated pixel information further includes transmitting the pixel information on each channel by directional transmission via directional antennas.

7. The method of claim 1, wherein transmitting the allocated pixel information on the multiple wireless channels further includes transmitting the allocated pixel information by time-division switched multi-beam transmission over said multiple wireless channels in a time-division manner with a weighted round-robin pattern.

8. The method of claim 1, wherein transmitting the allocated pixel information further includes transmitting the allocated pixel information by parallel multi-beam transmission over said multiple wireless channels.

9. The method of claim 1, wherein partitioning the pixel blocks into different partitions comprises partitioning based on multiple pixel index types within each pixel block.

10. The method of claim 9, wherein the multiple pixel index types comprise combinations of even and odd pixel indexes.

11. The method of claim 10, wherein the partitioning comprises combinations of vertical and horizontal partitioning of the spatially correlated pixels based on the partitioned pixel blocks.

12. The method of claim 11, wherein the multiple pixel index types comprise even and odd index combinations.

13. The method of claim 1, wherein the spatially correlated pixels comprise vertical and horizontal adjacent pixels, and the vertical and horizontal adjacent pixels are partitioned into different packets.

14. The method of claim 1, wherein the different packets are each transmitted separately over one or more of said multiple wireless channels.

15. The method of claim 1, wherein spatially correlated pixels comprise geographically neighboring pixels.

16. A wireless station for communicating video information over wireless channels, comprising:
   a spatial portioning module that partitions video pixel information by partitioning spatially correlated pixels into different pixel blocks and partitioning the spatially correlated pixels in the pixel blocks into different partitions based on pixel indexes of the spatially correlated pixels within each pixel block;
   a pixel allocation module that allocates pixel information from the pixel partitions across multiple wireless channels based on channel conditions; and
   a communications module that transmits the allocated pixel information on said multiple wireless channels,
   wherein the spatial portioning module places pixels from different partitions into different packets; and
   wherein the pixel allocation module allocates the pixel information from the pixel partitions across said multiple wireless channels: (i) by even distribution if the multiple channel conditions are similar, (ii) by uneven distribution if the multiple channel conditions are dissimilar, or (iii) by allocating pixel information from the pixel partitions to a subset of said multiple wireless channels, and allocating error correction information for said pixel information to another subset of said multiple wireless channels, based on channel conditions.

17. The station of claim 16, wherein the pixel allocation module adaptively allocates pixel information from the pixel partitions to said multiple wireless channels based on changing channel conditions.

18. The station of claim 16, wherein the video pixel information includes uncompressed video information.

19. The station of claim 16, wherein the communication module transmits the pixel information on each channel by beamforming transmission over multiple antennas.

20. The station of claim 16, wherein the communication module transmits the pixel information on each channel by directional transmission via directional antennas.

21. The station of claim 16, wherein the communication module transmits the allocated pixel information by time-division switched multi-beam transmission with a weighted round-robin pattern over said multiple wireless channels.

22. The station of claim 16, wherein the communication module transmits the allocated pixel information by parallel multi-beam transmission over said multiple wireless channels.

23. A wireless communication station for communicating video information over wireless channels, comprising:

a transmitting wireless station and a receiving wireless station;
wherein the transmitting wireless station includes:
    a spatial portioning module that partitions video pixel information by partitioning spatially correlated pixels into pixel blocks, and partitioning the spatially correlated pixels in the pixel blocks into different partitions based on pixel indexes of the spatially correlated pixels within each pixel block;
    a pixel allocation module that allocates pixel information from the pixel partitions across multiple wireless channels based on channel conditions; and
    a communications module that transmits the allocated pixel information on said multiple wireless channels via multiple antennas;
wherein the receiving wireless station includes a communications module that receives said pixel information on said multiple wireless channels via multiple antennas;
wherein the transmitting wireless station communication module and the receiving wireless station communication module engage in antenna training and beam switching control for communication of said pixel information over said multiple wireless channels,
wherein the spatial portioning module places pixels from different partitions into different packets; and
wherein the transmitting wireless station pixel allocation module allocates the pixel information from the pixel partitions across said multiple wireless channels: (i) by even distribution if the multiple channel conditions are similar, (ii) by uneven distribution if the multiple channel conditions are dissimilar, or (iii) by allocating pixel information from the pixel partitions to a subset of said multiple wireless channels, and allocating error correction information for said pixel information to another subset of said multiple wireless channels, based on channel conditions.

24. The wireless communication system of claim 23, wherein the transmitting wireless station communication module transmits the allocated pixel information by multi-beam transmission over said multiple channels in a time-division manner with a weighted round-robin pattern.

25. A wireless transmitting station for communicating video information over wireless channels, comprising:
    a spatial portioning module that partitions video pixel information by partitioning spatially correlated pixels into pixel blocks, and partitioning the spatially correlated pixels in the pixel blocks into different partitions based on pixel indexes of the spatially correlated pixels within each pixel block;
    a pixel allocation module that allocates pixel information from the pixel partitions across multiple wireless channels based on channel conditions; and
    a communications module that transmits the allocated pixel information on said multiple wireless channels via multiple antennas;
wherein the communication module engages in antenna training and beam switching control for communication of said pixel information over said multiple wireless channels,
wherein the spatial portioning module places pixels from different partitions into different packets; and
wherein the pixel allocation module allocates the pixel information from the pixel partitions across said multiple wireless channels: (i) by even distribution if the multiple channel conditions are similar, (ii) by uneven distribution if the multiple channel conditions are dissimilar, or (iii) by allocating pixel information from the pixel partitions to a subset of said multiple wireless channels, and allocating error correction information for said pixel information to another subset of said multiple wireless channels, based on channel conditions.

26. A wireless receiving station for communicating video information over wireless channels, comprising:
    a communications module that receives pixel information on multiple wireless channels via multiple antennas,
    wherein:
        correlated pixels are partitioned into pixel blocks, and the correlated pixels in the pixel blocks are partitioned into different partitions based on pixel indexes of the correlated pixels within each pixel block;
        pixel information from the pixel partitions are allocated across said multiple wireless channels based on channel conditions: (i) by even distribution if the multiple channel conditions are similar, (ii) by uneven distribution if the multiple channel conditions are dissimilar, or (iii) by allocating pixel information from the pixel partitions to a subset of said multiple wireless channels, and allocating error correction information for said pixel information to another subset of said multiple wireless channels, based on channel conditions;
        the communication module engages in antenna training and beam switching control for communication of said pixel information over said multiple wireless channels, and
        the correlated pixels from different partitions are included in different packets.

* * * * *